US012399616B2

(12) United States Patent
Ye (10) Patent No.: US 12,399,616 B2
(45) Date of Patent: Aug. 26, 2025

(54) METHOD FOR CONTROLLING MULTI-SCREEN DEVICE, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Qiuqiang Ye, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 12 days.

(21) Appl. No.: 18/463,533

(22) Filed: Sep. 8, 2023

(65) Prior Publication Data

US 2023/0418465 A1 Dec. 28, 2023

Related U.S. Application Data

(63) Continuation of application No. PCT/CN2022/070176, filed on Jan. 4, 2022.

(30) Foreign Application Priority Data

Mar. 16, 2021 (CN) .......................... 202110281308.8

(51) Int. Cl.
 G06F 3/04886 (2022.01)
 G06F 1/16 (2006.01)
 G06F 3/0485 (2022.01)
(52) U.S. Cl.
 CPC ........ G06F 3/04886 (2013.01); G06F 1/1641 (2013.01); G06F 1/1652 (2013.01);
 (Continued)

(58) Field of Classification Search
 CPC ..... G06F 1/16; G06F 3/14; G06F 3/01; G06F 3/0484; G06F 3/0485; G06F 3/04883;
 (Continued)

(56) References Cited

U.S. PATENT DOCUMENTS

| 2014/0089389 A1* | 3/2014 | Kim ....................... G06F 3/1423 |
| | | 709/203 |
| 2015/0338888 A1* | 11/2015 | Kim ....................... G06F 1/1677 |
| | | 345/156 |

(Continued)

FOREIGN PATENT DOCUMENTS

| CN | 107077295 | 8/2017 |
| CN | 108319422 | 7/2018 |

(Continued)

OTHER PUBLICATIONS

Wipo, International Search Report and Written Opinion for International Application No. PCT/CN2022/070176, Apr. 1, 2022.

(Continued)

Primary Examiner — Rayeez R Chowdhury
(74) Attorney, Agent, or Firm — Hodgson Russ LLP (57) ABSTRACT

A method for controlling a multi-screen device is provided in implementations of the disclosure. The method is applied to an electronic device with a foldable screen and includes the following. A gesture triggering event is detected through a secondary screen of the electronic device, when the electronic device is in a target state. Respond to the gesture triggering event through a main screen of the electronic device. An electronic device, and a storage medium are further provided in implementations of the disclosure.

20 Claims, 7 Drawing Sheets

(52) U.S. Cl.
CPC .. *G06F 3/0485* (2013.01); *G06F 2203/04803* (2013.01); *G06F 2203/04808* (2013.01)

(58) Field of Classification Search
CPC .... G06F 3/04886; G06F 3/0488; G06F 3/041; G06F 3/0481; G06F 16/9535; G06F 16/9536; G06F 18/20; G06F 18/2411; G06F 18/243; G06F 3/042; G06F 40/109; G06F 40/111
See application file for complete search history.

(56) References Cited

U.S. PATENT DOCUMENTS

| | | | | |
|---|---|---|---|---|
| 2017/0034446 | A1* | 2/2017 | Park | G06F 1/1641 |
| 2019/0339854 | A1* | 11/2019 | Wei | G06F 3/04883 |
| 2020/0233568 | A1* | 7/2020 | Wang | G06F 3/04845 |

FOREIGN PATENT DOCUMENTS

| | | |
|---|---|---|
| CN | 109857325 | 6/2019 |
| CN | 110620832 | 12/2019 |
| CN | 110839096 | 2/2020 |
| CN | 111182137 | 5/2020 |
| CN | 111262994 | 6/2020 |
| CN | 112463084 | 3/2021 |
| EP | 3287886 | 2/2018 |
| EP | 3370139 | 9/2018 |

OTHER PUBLICATIONS

EPO, Extended European Search Report for EP Application No. 22770162.0, Aug. 8, 2024.
CNIPA, Second Office Action for CN Application No. 202110281308.8, Aug. 16, 2024.
CNIPA, Rejection Decision for CN Application No. 202110281308.8, Oct. 21, 2024.
CNIPA, First Office Action for CN Application No. 202110281308.8, Apr. 20, 2024.
IPI, Office Action for IN Application No. 202317065215, Apr. 28, 2025.

* cited by examiner

METHOD FOR CONTROLLING MULTI-SCREEN DEVICE, ELECTRONIC DEVICE, AND STORAGE MEDIUM

CROSS-REFERENCE TO RELATED APPLICATION(S)

This application is a continuation of International Application No. PCT/CN2022/070176, filed Jan. 4, 2022, which claims priority to Chinese Patent Application No. 202110281308.8, filed Mar. 16, 2021, the entire disclosures of which are incorporated herein by reference.

TECHNICAL FIELD

This disclosure relates to but is not limited to the field of computer technology, in particular to a method for controlling a multi-screen device, an electronic device, and a storage medium.

BACKGROUND

With the popularity of smart touch devices, the gesture operation has become one of mainstream operations and interaction modes of the smart touch device. At present, the foldable screen technology is mature, and the smart device with the foldable screen has been launched.

For the smart device with the foldable screen, the global gesture needs to hijack the operation of the system. When the smart device with the foldable screen realizes some functions, it needs to perform two steps: "detecting click operation" and "responding to click operation". After the gesture appears, the smart device with the foldable screen must perform the following three steps: "detecting click operation", "determining whether it is a defined gesture operation", and "responding to click operation". It should be noted that, in the case of more defined gestures, the above determination step will take longer execution time, which will lead to longer response time of the click operation and poor user experience.

SUMMARY

A method for controlling a multi-screen device is provided. The method is applied to an electronic device with a foldable screen and includes the following. A gesture triggering event is detected through a secondary screen of the electronic device, when the electronic device is in a target state. Respond to the gesture triggering event through a main screen of the electronic device.

An electronic device is provided. The electronic device includes at least one processor and a memory. The memory is coupled to the at least one processor and stores at least one computer executable instruction thereon. When executed by the at least one processor, the at least one computer executable instruction causes the at least one processor to execute the above method for controlling the multi-screen device.

A non-transitory computer readable storage medium is provided. The non-transitory computer readable storage medium is configured to store a computer program. When executed by a processor, the computer program causes the processor to execute the above method for controlling the multi-screen device.

DETAILED DESCRIPTION

To make the object, technical solutions, and advantages of the disclosure clearer, the disclosure will be described in further detail below in conjunction with the accompanying drawings. The described implementations should not be regarded as limiting to the disclosure, and all other implementations obtained by those of ordinary skill in the art without creative work fall within the scope of protection of the disclosure.

In the following description, reference is made to "some implementations" that describe a subset of all possible implementations, but it is understood that "some implementations" may be the same subset or different subsets of all possible implementations and may be combined with each other without conflict.

In the following description, the term "first/second/third" is referred to only to distinguish similar objects and does not represent a particular order for objects, and it is understood that "first/second/third" may be interchanged in a particular order or priority order where permissible, to enable implementations of the disclosure described herein to be implemented in an order other than that illustrated or described herein.

Unless otherwise defined, all technical and scientific terms used herein have the same meaning as would normally be understood by those skilled in the art of the disclosure. The term used herein is for describing implementations of the disclosure only and is not intended to limit the disclosure.

In a first aspect, a method for controlling a multi-screen device is provided in implementations of the disclosure. The method is applied to an electronic device with a foldable screen and includes the following. A gesture triggering event is detected through a secondary screen of the electronic device, when the electronic device is in a target state. Respond to the gesture triggering event through a main screen of the electronic device.

In some implementations, the main screen is disposed on one surface of the electronic device and the secondary screen is disposed on another surface opposite to the one surface of the electronic device, the main screen is a foldable screen, and the gesture triggering event is detected through the secondary screen of the electronic device as follows. The gesture triggering event is detected through the secondary screen, when determining that the main screen is in a screen-on state and the secondary screen is in a screen-off state.

In some implementations, respond to the gesture triggering event through the main screen of the electronic device as follows. Respond to the gesture triggering event through the main screen, when the gesture triggering event satisfies a main-screen triggering condition.

In some implementations, the gesture triggering event satisfying the main-screen triggering condition includes: an operation gesture on the secondary screen satisfying a gesture triggering condition and an operation trajectory on the secondary screen satisfying a trajectory triggering condition.

In some implementations, the gesture triggering event satisfying the main-screen triggering condition further includes: the operation gesture satisfying a condition of a gesture in a target direction and the operation trajectory satisfying a condition of a trajectory formed along the target direction.

In some implementations, respond to the gesture triggering event through the main screen as follows, when the gesture triggering event satisfies the main-screen triggering condition. A split screen mode is started through the main screen, and at least one display interface after split-screen is displayed on the main screen, when the operation gesture satisfies a condition of a gesture in a first direction and the operation trajectory satisfies a condition of a trajectory formed along the first direction.

In some implementations, the split screen mode is started through the main screen, and the at least one display interface after split-screen is displayed on the main screen as follows. The split screen mode is started through the main screen, and a current display interface is scaled down towards the first direction on the main screen and the scaled-down current display interface is displayed, when the first direction is on the surface where the secondary screen is disposed and is from a region without the secondary screen to a region with the secondary screen.

In some implementations, respond to the gesture triggering event through the main screen as follows, when the gesture triggering event satisfies the main-screen triggering condition. A first application is started through the main screen, and an application interface of the first application is displayed on the main screen, when the operation gesture is in a second direction and the operation trajectory satisfies a condition of a trajectory formed along the second direction.

In some implementations, respond to the gesture triggering event through the main screen as follows. Determine that at least one switchable information exists in current information output from the main screen, switch to information to-be-switched in the at least one switchable information through the main screen, and the information to-be-switched is output.

In some implementations, before switching to the information to-be-switched in the at least one switchable information through the main screen, the method further includes the following. The information to-be-switched corresponding to the operation trajectory is selected from an information sequence of the at least one switchable information, when the operation gesture is changed from a third direction to a fourth direction and the operation trajectory satisfies a condition of a trajectory formed from the third direction to the fourth direction.

In some implementations, the information to-be-switched corresponding to the operation trajectory is selected from the information sequence of the at least one switchable information as follows. The number of trajectories of at least two ordered operation trajectories is determined. The information to-be-switched corresponding to the at least two ordered operation trajectories is selected from the information sequence based on the number of trajectories, where a difference between a ranking of the current information in the information sequence and a ranking of the information to-be-switched in the information sequence is equal to the number of trajectories.

In a second aspect, an apparatus for controlling a multi-screen device is provided in implementations of the disclosure. The apparatus includes a detecting unit and a processing unit. The detecting unit is configured to detect a gesture triggering event through a secondary screen of an electronic device, when the electronic device is in a target state. The processing unit is configured to respond to the gesture triggering event through a main screen of the electronic device.

In some implementations, the main screen is disposed on one surface of the electronic device and the secondary screen is disposed on another surface opposite to the one surface of the electronic device, the main screen is a foldable screen, and the detecting unit is further configured to: detect the gesture triggering event through the secondary screen, when determining that the main screen is in a screen-on state and the secondary screen is in a screen-off state.

In some implementations, the processing unit is further configured to respond to the gesture triggering event through the main screen, when the gesture triggering event satisfies a main-screen triggering condition.

In some implementations, the gesture triggering event satisfying the main-screen triggering condition includes: an operation gesture on the secondary screen satisfying a gesture triggering condition and an operation trajectory on the secondary screen satisfying a trajectory triggering condition.

In some implementations, the gesture triggering event satisfying the main-screen triggering condition further includes: the operation gesture satisfying a condition of a gesture in a target direction and the operation trajectory satisfying a condition of a trajectory formed along the target direction.

In some implementations, the processing unit is further configured to: start a split screen mode through the main screen, and display at least one display interface after split-screen on the main screen, when the operation gesture satisfies a condition of a gesture in a first direction and the operation trajectory satisfies a condition of a trajectory formed along the first direction.

In some implementations, the processing unit is further configured to: start the split screen mode through the main screen, and scale down a current display interface towards the first direction on the main screen and display the scaled-down current display interface, when the first direction is on the surface where the secondary screen is disposed and is from a region without the secondary screen to a region with the secondary screen.

In some implementations, the processing unit is further configured to: start a first application through the main screen, and display an application interface of the first application on the main screen, when the operation gesture is in a second direction and the operation trajectory satisfies a condition of a trajectory formed along the second direction.

In some implementations, the processing unit is further configured to: determine that at least one switchable information exists in current information output from the main screen, switch to information to-be-switched in the at least one switchable information through the main screen, and output the information to-be-switched.

In some implementations, the processing unit is further configured to: select the information to-be-switched corresponding to the operation trajectory from an information sequence of the at least one switchable information, when the operation gesture is changed from a third direction to a fourth direction and the operation trajectory satisfies a condition of a trajectory formed from the third direction to the fourth direction.

In some implementations, the processing unit is further configured to: determine the number of trajectories of at least two ordered operation trajectories; and select the information to-be-switched corresponding to the at least two ordered operation trajectories from the information sequence based on the number of trajectories, where a difference between a ranking of the current information in the information sequence and a ranking of the information to-be-switched in the information sequence is equal to the number of trajectories.

In a third aspect, an electronic device is provided in implementations of the disclosure. The electronic device includes a processor, a memory, and a communication bus. The communication bus is configured to implement a communication connection between the processor and the memory. The processor is configured to execute programs for controlling a multi-screen device stored in the memory, to implement steps of the above method for controlling the multi-screen device.

In a fourth aspect, a storage medium is provided in implementations of the disclosure. The storage medium stores one or more programs executable by one or more processors to implement steps of the above method for controlling a multi-screen device.

Figure 1:
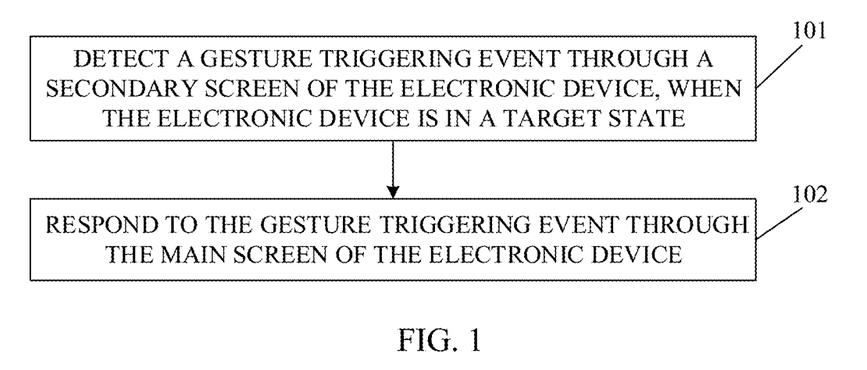
FIG. 1 is schematic flow chart 1 of a method for controlling a multi-screen device provided in implementations of the disclosure.

Implementations of the disclosure provide a method for controlling a multi-screen device. The method is applied to an electronic device with a foldable screen. Referring to FIG. 1, the method includes the following.

101, a gesture triggering event is detected through a secondary screen of the electronic device, when the electronic device is in a target state.

In implementations of the disclosure, the electronic device may include a mobile terminal device such as a mobile phone, a tablet computer, a notebook computer, a personal digital assistant (PDA), a camera, a wearable device, and a fixed terminal device such as a desktop computer.

In implementations of the disclosure, the electronic device with the foldable screen is embodied as an inward-folding electronic device or a forward-folding electronic device. The foldable screen of the electronic device includes two folding half-screens, and in a feasible structure, a hinge structure is arranged between the two folding half-screens. When the electronic device is in an unfolded state, which is also called a tiled state, the two folding half-screens are tiled to assemble into the complete foldable screen. When the electronic device is in a folded state, the two folding half-screens are separated from each other and have respective folding angles with respect to the hinge structure.

For the inward-folding electronic device, a main screen of the electronic device is disposed on one surface of the electronic device and a secondary screen of the electronic device is disposed on another surface opposite to the one surface of the electronic device, and the main screen is a foldable screen. Exemplarily, the area of the secondary screen of the electronic device is smaller than the area of the main screen of the electronic device. For the inward-folding electronic device, the electronic device is in the folded state, that is, the main screen is in the folded state, and the electronic device is in the unfolded state, that is, the main screen is in the unfolded state, and in this case, the foldable main screen includes two folding half-screens. When the electronic device is in the folded state, display interfaces of the two half-screens of the foldable main screen are close to each other.

For the forward-folding electronic device, the secondary screen and the main screen of the electronic device are arranged on one surface of the electronic device. In this case, the secondary screen and the main screen are two half-screens of the foldable screen, and the area of the secondary screen of the foldable screen can be the same as or different from the area of the main screen of the foldable screen. For the forward-folding electronic device, when the electronic device is in the folded state, display interfaces of the two folding half-screens are separated from each other.

In implementations of the disclosure, the gesture triggering event includes an operation gesture on the secondary screen of the electronic device and an operation trajectory on the secondary screen.

In some implementations, when the electronic device is in the unfolded state or the folded state, the secondary screen of the electronic device may be in a screen-off state or a screen-on state, and the gesture triggering event is detected through the secondary screen of the electronic device.

Exemplarily, a target region of the secondary screen of the electronic device may be preset for detecting the gesture triggering event. Alternatively, the secondary screen of the electronic device under the main interface, i.e., launcher interface, is used for detecting the gesture triggering event. Alternatively, the secondary screen of the electronic device in the screen-off state is used for detecting the gesture triggering event. In this way, the detection accuracy can be improved and the conflict with a secondary-screen gesture can be avoided.

102, respond to the gesture triggering event through the main screen of the electronic device.

In implementations of the disclosure, both the inward-folding electronic device and the forward-folding electronic device can hand over the detection and determination to the secondary screen of the electronic device, and the electronic device executes the operation of responding to the gesture triggering event. As such, the event executed through the main screen of the electronic device can be reduced and the response speed of the main screen of the electronic device can be improved.

The method for controlling the multi-screen device is provided in the disclosure. The method is applied to the electronic device with the foldable screen and includes the following. The gesture triggering event is detected through the secondary screen of the electronic device, when the electronic device is in the target state and respond to the gesture triggering event through the main screen of the electronic device. That is, in the disclosure, the detection and determination is handed over to the secondary screen of the electronic device, and the electronic device executes the operation of responding to the gesture triggering event. As such, the event executed through the main screen of the electronic device can be reduced, the response speed of the main screen of the electronic device can be improved, and the interactive mode of the electronic device with the foldable screen can be improved, improving the use experience of the user.

Hereinafter, taking the electronic device with the foldable screen as the inward-folding electronic device as an example, the method for controlling the multi-screen device provided in the disclosure will be described.

Figure 2:
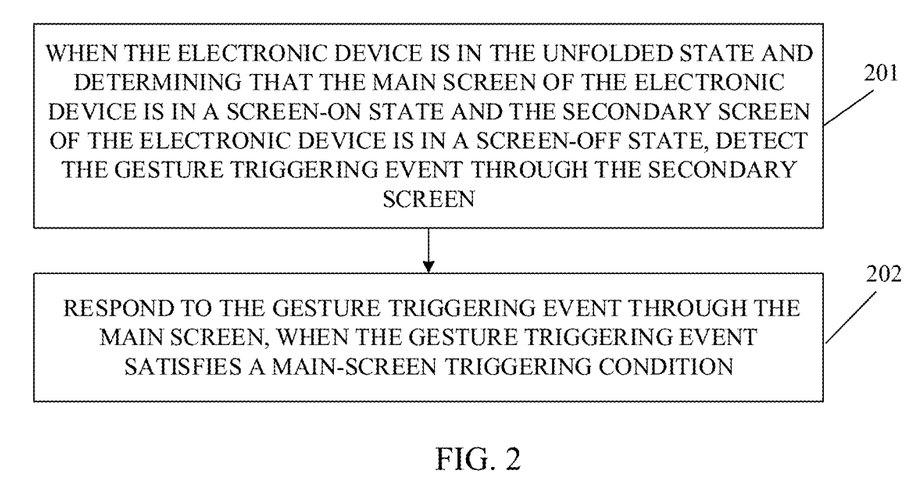
FIG. 2 is schematic flow chart 2 of a method for controlling a multi-screen device provided in implementations of the disclosure.

Implementations of the disclosure provides a method for controlling a multi-screen device, which is applied to the inward-folding electronic device. Referring to FIG. 2, the method includes the following.

201, when the electronic device is in the unfolded state and determining that the main screen of the electronic device is in a screen-on state and the secondary screen of the electronic device is in a screen-off state, the gesture triggering event is detected through the secondary screen.

In this case, the electronic device is in the unfolded state, i.e., the foldable main screen of the inward-folding electronic device is in the unfolded state.

Figure 3:
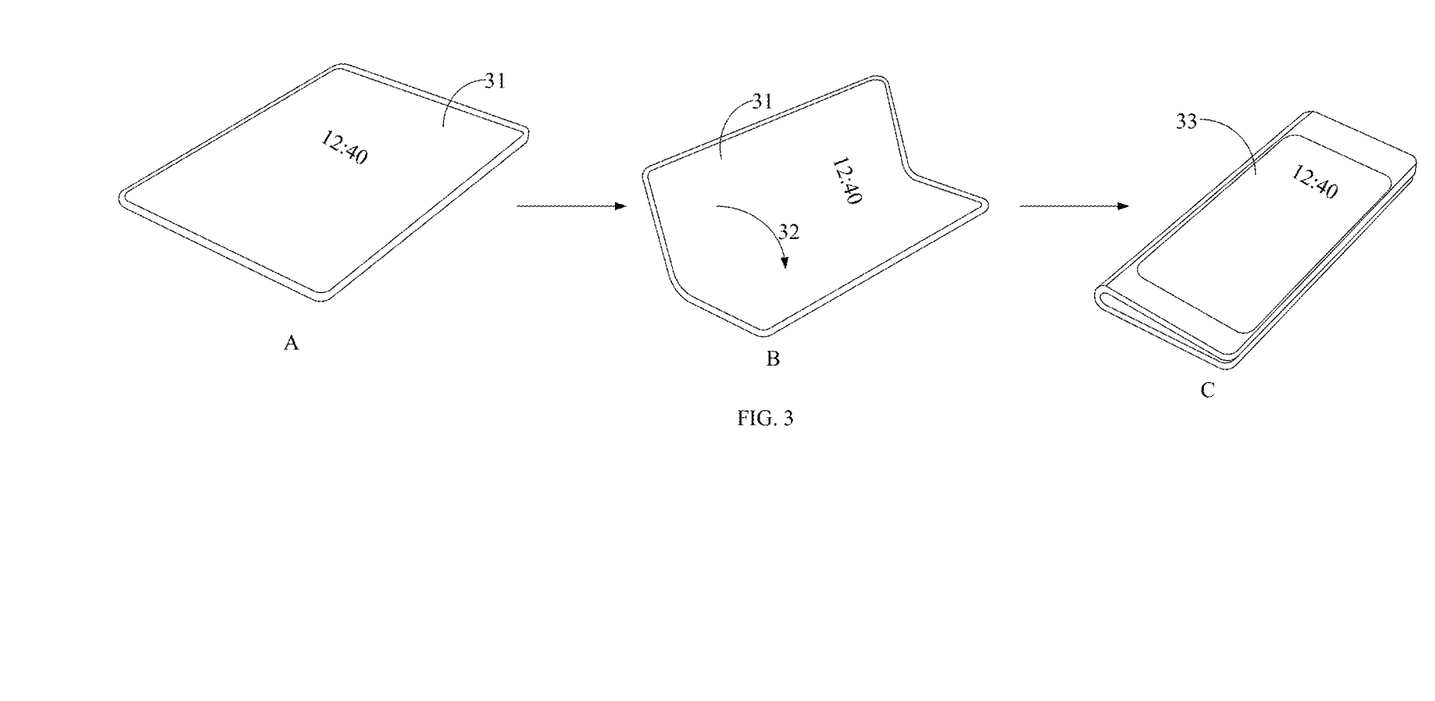
FIG. 3 at A-C illustrates a schematic diagram of change in form of a multi-screen device provided in implementations of the disclosure.

Herein, the form of the inward-folding electronic device is explained in combination with FIG. 3. FIG. 3 at A illustrates the form of the inward-folding electronic device in the unfolded state, similar to the form of a book. When unfolded, there will be a large screen to achieve the purpose of using the large screen. Exemplarily, the main screen 31 is in the screen-on state in A of FIG. 3. FIG. 3 at B illustrates shows a schematic diagram of folding the main screen 31 of the inward-folding electronic device in the clockwise direction indicated by 32. FIG. 3 at C illustrates the form of the inward-folding electronic device in the folded state, and in this case, the main screen 31 of the inward-folding electronic device is hidden and the secondary screen 33 of the inward-folding electronic device is exposed to the outside. Exemplarily, FIG. 3 at C illustrates a schematic diagram of the secondary screen 33 of the electronic device in the screen-on state. When the inward-folding electronic device is in the folded state, the secondary screen of the electronic device serves as a small screen, which is convenient for daily use.

Figure 4:
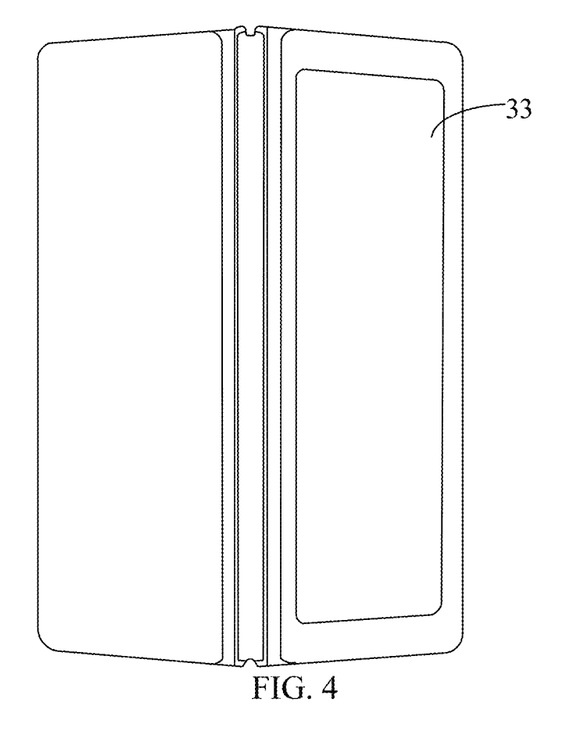
FIG. 4 is a side view of a multi-screen device in a folded state provided in implementations of the disclosure.

As an example, FIG. 4 is a side view of the inward-folding electronic device during folding of the inward-folding electronic device in the clockwise direction indicated by 32 of B in FIG. 3. During folding, the secondary screen 33 of the electronic device is in the screen-off state.

In implementations of the disclosure, the gesture triggering event includes the operation gesture on the secondary screen of the electronic device and the operation trajectory on the secondary screen.

Figure 5:
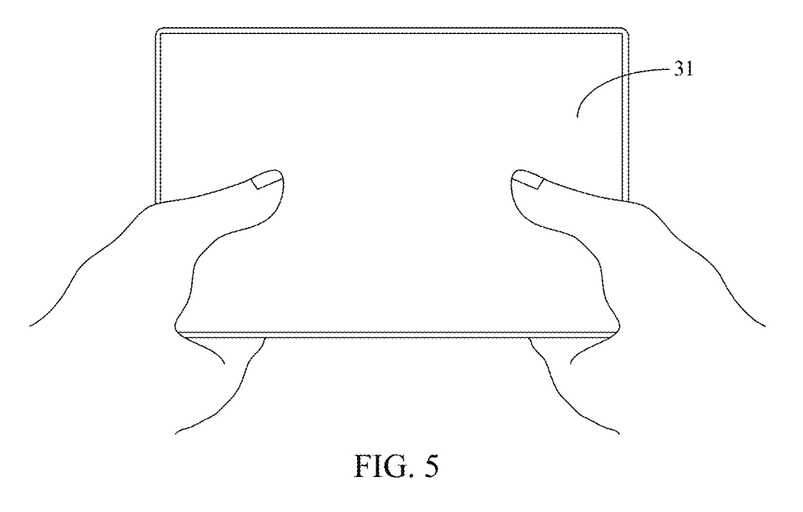
FIG. 5 is a schematic diagram of an inward-folding electronic device hold with two hands provided in implementations of the disclosure.

As illustrated in FIG. 5, when the main screen 31 of the electronic device is in the screen-on state, the user is using the main screen 31 of the electronic device, and the inward-folding electronic device can control the secondary screen of the electronic device to be in the screen-off state, and the gesture triggering event is detected through the secondary screen of the electronic device, thereby further improving the accuracy of gesture detection and avoiding misoperation.

202, respond to the gesture triggering event through the main screen, when the gesture triggering event satisfies a main-screen triggering condition.

In some implementations of the disclosure, the gesture triggering event satisfying the main-screen triggering condition includes: the operation gesture on the secondary screen satisfying a gesture triggering condition and the operation trajectory on the secondary screen satisfying a trajectory triggering condition.

Herein, the operation gesture includes but is not limited to a sliding operation gesture and/or a clicking operation gesture. The operation trajectory is a trajectory generated by applying the operation gesture to the secondary screen.

That is, when the inward-folding electronic device detects the gesture triggering event through the secondary screen of the electronic device and determines that the operation gesture on the secondary screen of the electronic device included in the gesture triggering event satisfies the gesture triggering condition and the operation trajectory included in the gesture triggering event satisfies the trajectory triggering condition, the gesture triggering event is responded through the main screen of the electronic device.

In other implementations of the disclosure, the gesture triggering event satisfying the main-screen triggering condition further includes: the operation gesture satisfying a condition of a gesture in a target direction and the operation trajectory satisfying a condition of a trajectory formed along the target direction.

That is, when the inward-folding electronic device detects the gesture triggering event through the secondary screen of the electronic device and determines that the operation gesture on the secondary screen of the electronic device included in the gesture triggering event satisfies the condition of the gesture in the target direction and the operation trajectory included in the gesture triggering event satisfies the condition of the trajectory formed along the target direction, the gesture triggering event is responded through the main screen of the electronic device.

Further, in implementations of the disclosure, the target direction includes a single direction and a changeable direction. That is, the operation gesture may be an operation gesture in the single direction, or the operation gesture may also be an operation gesture in the changeable direction.

In the first feasible scenario, the target direction is the single direction, such as a first direction. Then, when the gesture triggering event satisfies the main-screen triggering condition, respond to the gesture triggering event through the main screen as follows.

A split screen mode is started through the main screen, and at least one display interface after split-screen is displayed on the main screen, when the operation gesture satisfies a condition of a gesture in the first direction and the operation trajectory satisfies a condition of a trajectory formed along the first direction.

Figure 6:
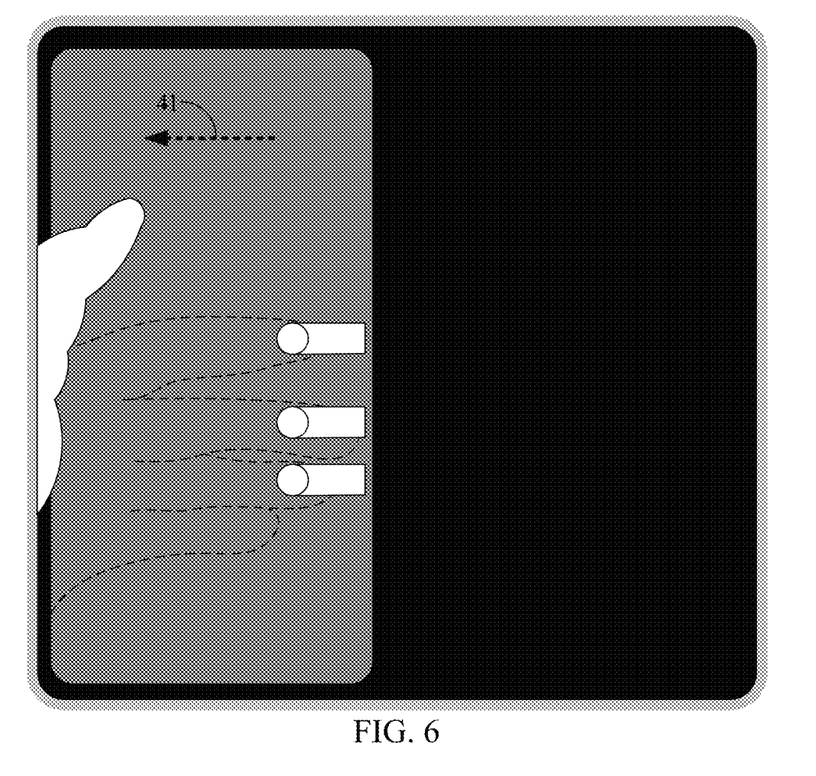
FIG. 6 is a schematic operation diagram of starting a split screen mode with three-finger slide-to-left provided in implementations of the disclosure.

Herein, the first direction may be a direction that extends linearly from a start position to an end position on the surface where the secondary screen is disposed. The first direction includes but is not limited to a horizontal leftward direction or a horizontal rightward direction on the surface where the secondary screen is disposed. In implementations of the disclosure, when the split screen mode is started, the inward-folding electronic device can associate the first direction with a split screen direction. The split screen direction refers to the direction in which the current display interface on the main screen changes in position before and after split-screen is enabled. For example, as illustrated in FIG. 6, the first direction is the slide-to-left direction illustrated in FIG. 6 and the split screen direction is the same as the first direction, and then after the split screen is started, the current display interface on the main screen is scaled down and then displayed in the left region of the main screen. The first direction may also be set opposite to the split screen direction, which is not specifically limited in the disclosure.

Further, in the scenario of realizing split-screen, the split screen mode is started through the main screen, and the at least one display interface after split-screen is displayed on the main screen as follows.

The split screen mode is started through the main screen, and a current display interface is scaled down towards the first direction on the main screen and the scaled-down current display interface is displayed, when the first direction is on the surface where the secondary screen is disposed and is from a region without the secondary screen to a region with the secondary screen.

Figure 7:
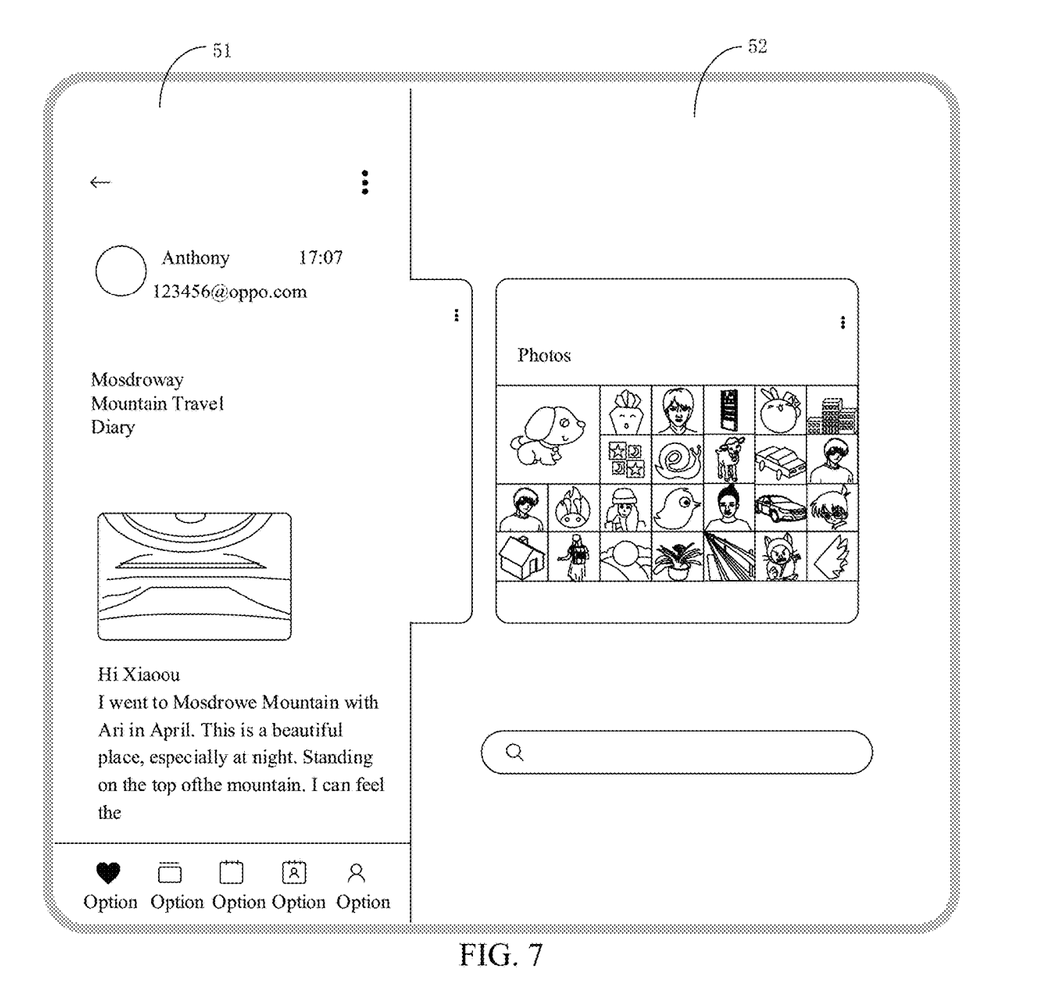
FIG. 7 is a schematic interface diagram of a main screen of an electronic device after split-screen provided in implementations of the disclosure.

For example, as illustrated in FIG. 5, the inward-folding electronic device is hold by the user with both hands, with the thumb resting on the main screen 31 of the electronic device and the other four fingers resting on the back of the main screen 31 of the electronic device. Further, as illustrated in FIG. 6, if the secondary screen of the electronic device is at the position of the left hand, the user can use the left hand to perform a three-finger slide-to-left operation on the secondary screen of the electronic device in the direction from right to left indicated by 41. When the inward-folding electronic device determines that the operation gesture of the three-finger slide-to-left satisfies the condition of the gesture in the first direction and the operation trajectory satisfies the condition of the trajectory formed along the first direction, the split screen mode is started through the main screen of the electronic device, and the at least one display interface after split-screen is displayed on the main screen of the electronic device. As such, through sliding of the user in a specific single direction on the secondary screen of the electronic device, quick split-screen for the main screen of the electronic device can be achieved. As illustrated in FIG. 7, when the inward-folding electronic device starts the split screen mode, two display interfaces after split-screen are displayed on the main screen of the electronic device. For example, before the split screen mode is started, a first display interface and a second display interface are sequentially displayed on the main screen of the electronic device, and the first display interface is covered after the second display interface is displayed. Then, after the split screen mode is started, all the unclosed interfaces are displayed on the main screen of the electronic device and the second display interface 51 is displayed on the left and the first display interface 52 is displayed on the right.

In other application scenarios, if the secondary screen of the electronic device is at the position of the right hand, the user can use the right hand to perform a three-finger slide-to-right operation on the secondary screen of the electronic device in a direction opposite to the direction indicated by 41 in FIG. 6. When the inward-folding electronic device determines that the operation gesture of the three-finger slide-to-right satisfies the condition of the gesture in the first direction and the operation trajectory satisfies the condition of the trajectory formed along the first direction, the split screen mode is started through the main screen of the electronic device.

It should be noted that the remaining region of the main screen of the electronic device is used for displaying other contents and/or other interfaces, and the remaining region is a region of the main screen of the electronic device other than a region for displaying the scaled-down current display interface. Further, in implementations of the disclosure, the position of the display region of the current display interface and the areas of the display region of the current display interface and the display regions of other display interfaces after the split screen mode is started are not specifically limited.

In a second feasible scenario, the target direction is the single direction, such as a second direction. Then, respond to the gesture triggering event through the main screen as follows, when the gesture triggering event satisfies the main-screen triggering condition.

A first application is started through the main screen of the electronic device, and an application interface of the first application is displayed on the main screen of the electronic device, when the operation gesture is in the second direction and the operation trajectory satisfies a condition of a trajectory formed along the second direction.

Herein, the second direction may be a clockwise direction or a counterclockwise direction. The first application may be a preset quick start application, and the preset quick start application has at least one data. If there are multiple preset quick start applications, different applications can be respectively started by operation gestures in the second direction that are sequentially performed.

In the case that the second application has been displayed or started on the main screen of the electronic device, the first application associated with the second application can be quickly started through the operation gesture in the second direction. The first application may be an application whose degree of association with the second application satisfies a threshold of degree of association among all applications installed in the inward-folding electronic device. For example, in the case where the mail application has been displayed on the main screen of the electronic device, the call application/Notepad application may be quickly started through the operation gesture along the second direction, and the user may dial the telephone number in the mail through the call application or record the information in the mail in the Notepad application.

Figure 8:
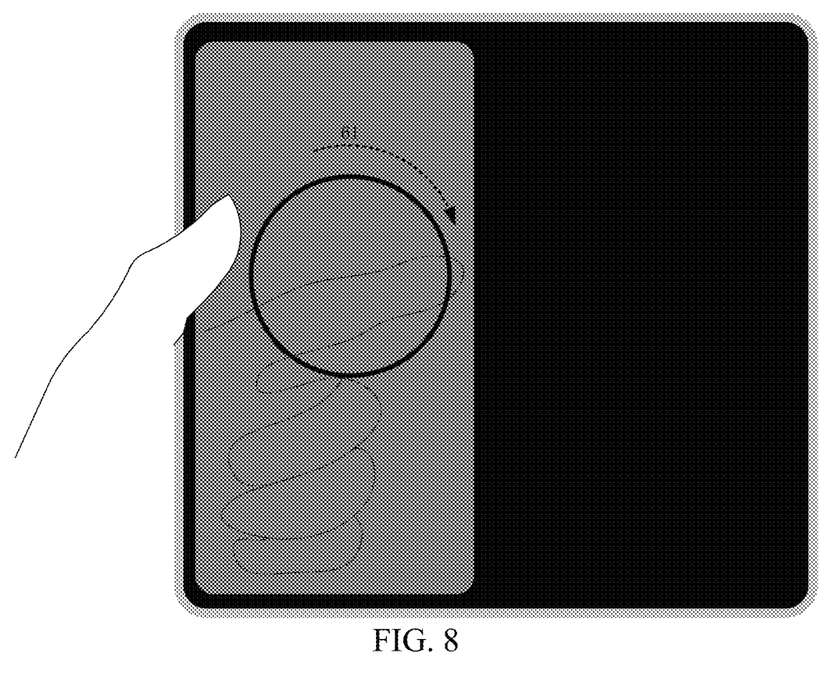
FIG. 8 is a schematic operation diagram of quick starting of a first application with a clockwise gesture provided in implementations of the disclosure.

Exemplarily, as illustrated in FIG. 8, the user may use the left hand to perform a circle drawing operation on the secondary screen of the electronic device in the clockwise direction indicated by 61. When the inward-folding electronic device determines that the operation gesture satisfies the condition of the gesture in the second direction and the operation trajectory satisfies the condition of the trajectory formed along the second direction, the first application is started through the main screen of the electronic device, and the application interface of the first application is displayed on the main screen of the electronic device. As such, through sliding of the user in a specific single direction on the secondary screen of the electronic device, the first application can be quickly started and the first application can be displayed on the main screen of the electronic device. In implementations of the disclosure, the operation trajectory satisfying the condition of the trajectory formed along the second direction may further include the condition that the length of the trajectory formed along the second direction is larger than a trajectory-length threshold. For example, when the circle drawing operation is performed in the clockwise direction, and when the length of the trajectory is greater than ½ of the length of the closed circular trajectory, the first application is quickly started. In other implementations of the disclosure, the gesture operation in the clockwise direction may be a sliding operation gesture similar to a circle or a click operation gesture of multiple clicks along a clockwise circular trajectory.

In a third feasible scenario, the target direction is the single direction such as the first direction or the second direction. Then, when the gesture triggering event satisfies the main-screen triggering condition, respond to the gesture triggering event through the main screen as follows.

When the operation gesture satisfies the condition of the gesture in the first direction and the operation trajectory satisfies the condition of the trajectory formed along the first direction, determine that at least one switchable information exists in current information output from the main screen of the electronic device, switch to information to-be-switched in the at least one switchable information through the main screen of the electronic device, and the information to-be-switched is output.

Alternatively, when the operation gesture satisfies the operation gesture in the second direction and the operation trajectory satisfies the condition of the trajectory formed along the second direction, determine that at least one switchable information exists in current information output from the main screen of the electronic device, switch to information to-be-switched in the at least one switchable information through the main screen of the electronic device, and the information to-be-switched is output.

It should be noted that the solution of starting the split screen mode, the solution of quickly starting the first application, and the solution of the information to-be-switched provided in implementations of the disclosure can be combined with each other. For example, after the split screen mode is started, the first application is quickly started, and then the output information is switched in the process of outputting information by the first application. For another example, after the first application is quickly started, the split screen mode is started, and the output information is switched in the split screen scenario after the split-screen. That is, in implementations of the disclosure, the execution order of the solution of starting the split screen mode, the solution of quickly starting the first application, and the solution of the information to-be-switched is not specifically limited, and any combination solution belongs to the protection scope of the disclosure.

In a fourth feasible scenario, the target direction is the changeable direction, e.g. changed from a third direction to a fourth direction. Then, when the gesture triggering event satisfies the main-screen triggering condition, respond to the gesture triggering event through the main screen of the electronic device as follows.

The information to-be-switched corresponding to the operation trajectory is selected from an information sequence of the at least one switchable information, switch to information to-be-switched in the at least one switchable information through the main screen of the electronic device, and the information to-be-switched is output, when the operation gesture is changed from the third direction to the fourth direction and the operation trajectory satisfies a condition of a trajectory formed from the third direction to the fourth direction.

Figure 9:
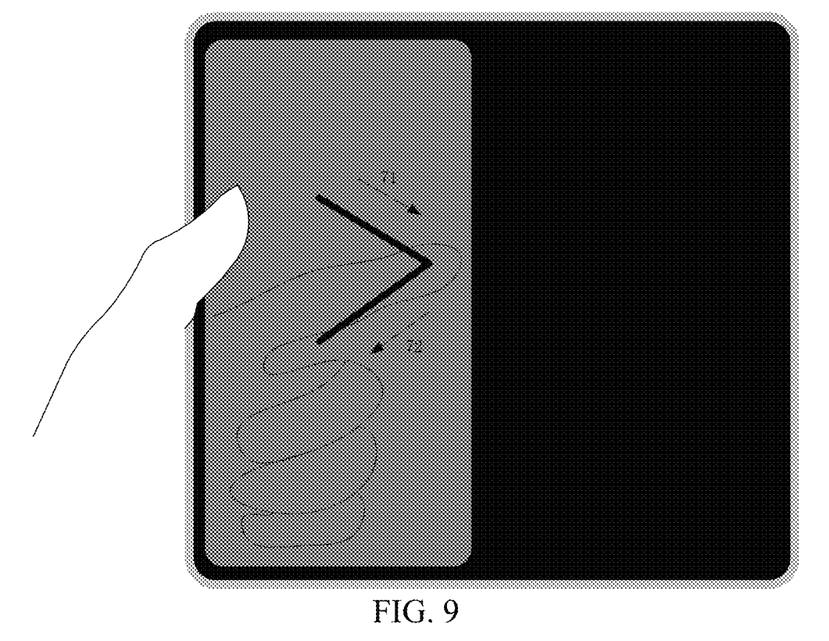
FIG. 9 is a schematic operation diagram of switching output information provided in implementations of the disclosure.

Exemplarily, as illustrated in FIG. 9, the user may use the left hand to perform a sliding operation on the secondary screen of the electronic device in the direction indicated by 71 and then perform a sliding operation in the direction indicated by 72. When the inward-folding electronic device determines that the operation gesture is changed from the third direction to the fourth direction and the operation trajectory satisfies the condition of the trajectory formed from the third direction to the fourth direction, the information to-be-switched corresponding to the operation trajectory is selected from the information sequence of the at least one switchable information, switch to information to-be-switched in the at least one switchable information through the main screen of the electronic device, and the information to-be-switched is output. As such, through sliding of the user in the changeable direction on the secondary screen of the electronic device, the output information can be switched.

In a feasible scenario, in the process of playing multimedia information on the main screen of the electronic device, the next output object can be triggered to be switched through the operation gesture in the changeable direction. The multimedia information includes, but is not limited to, music, images, videos, and documents.

Further, when there are multiple operation gestures, the information to-be-switched corresponding to the operation trajectory is selected from the information sequence of the at least one switchable information as follows.

The number of trajectories of at least two ordered operation trajectories is determined. The information to-be-switched corresponding to the at least two ordered operation trajectories is selected from the information sequence based on the number of trajectories, where a difference between a ranking of the current information in the information sequence and a ranking of the information to-be-switched in the information sequence is equal to the number of trajectories.

It should be noted that the same steps and contents in the implementation as in other implementations can be described with reference to other implementations and will not be repeated herein.

Figure 10:
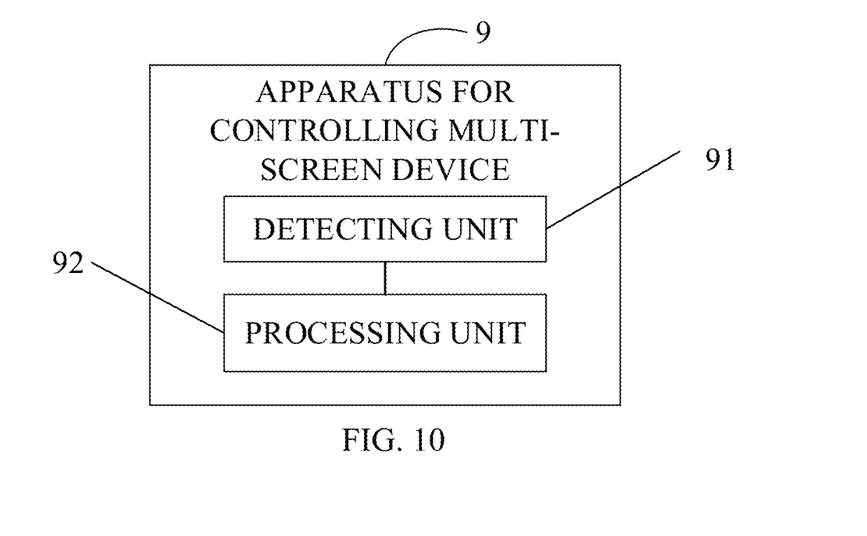
FIG. 10 is a schematic structural diagram of an apparatus for controlling a multi-screen device provided in implementations of the disclosure.

Implementations of the disclosure provide an apparatus for controlling a multi-screen device. The apparatus can be applied to the method for controlling the multi-screen device provided in implementations corresponding to FIG. 1 and FIG. 2. Referring to FIG. 10, the apparatus 9 includes a detecting unit 91 and a processing unit 92.

The detecting unit 91 is configured to detect a gesture triggering event through a secondary screen of an electronic device, when the electronic device is in a target state. The processing unit 92 is configured to respond to the gesture triggering event through a main screen of the electronic device.

In other implementations of the disclosure, the main screen is disposed on one surface of the electronic device and the secondary screen is disposed on another surface opposite to the one surface of the electronic device, the main screen is a foldable screen, and the detecting unit 91 is further configured to: detect the gesture triggering event through the secondary screen, when determining that the main screen is in a screen-on state and the secondary screen is in a screen-off state.

In other implementations of the disclosure, the processing unit 92 is further configured to respond to the gesture triggering event through the main screen, when the gesture triggering event satisfies a main-screen triggering condition.

In other implementations of the disclosure, the gesture triggering event satisfying the main-screen triggering condition includes: an operation gesture on the secondary screen satisfying a gesture triggering condition and an operation trajectory on the secondary screen satisfying a trajectory triggering condition.

In other implementations of the disclosure, the gesture triggering event satisfying the main-screen triggering condition further includes: the operation gesture satisfying a condition of a gesture in a target direction and the operation trajectory satisfying a condition of a trajectory formed along the target direction.

In other implementations of the disclosure, the processing unit 92 is further configured to: start a split screen mode through the main screen, and display at least one display interface after split-screen on the main screen, when the operation gesture satisfies a condition of a gesture in a first direction and the operation trajectory satisfies a condition of a trajectory formed along the first direction.

In other implementations of the disclosure, the processing unit 92 is further configured to: start the split screen mode through the main screen, and scale down a current display interface towards the first direction on the main screen and display the scaled-down current display interface, when the first direction is on the surface where the secondary screen is disposed and is from a region without the secondary screen to a region with the secondary screen.

In other implementations of the disclosure, the processing unit 92 is further configured to: start a first application through the main screen, and display an application interface of the first application on the main screen, when the operation gesture is in a second direction and the operation trajectory satisfies a condition of a trajectory formed along the second direction.

In other implementations of the disclosure, the processing unit 92 is further configured to: determine that at least one switchable information exists in current information output from the main screen, switch to information to-be-switched in the at least one switchable information through the main screen, and output the information to-be-switched.

In other implementations of the disclosure, the processing unit 92 is further configured to: select the information to-be-switched corresponding to the operation trajectory from an information sequence of the at least one switchable information, when the operation gesture is changed from a third direction to a fourth direction and the operation trajectory satisfies a condition of a trajectory formed from the third direction to the fourth direction.

In other implementations of the disclosure, the processing unit 92 is further configured to: determine the number of trajectories of at least two ordered operation trajectories; and select the information to-be-switched corresponding to the at least two ordered operation trajectories from the information sequence based on the number of trajectories, where a difference between a ranking of the current information in the information sequence and a ranking of the information to-be-switched in the information sequence is equal to the number of trajectories.

It should be noted that the same steps and contents in the implementation as in other implementations can be described with reference to other implementations and will not be repeated herein.

Figure 11:
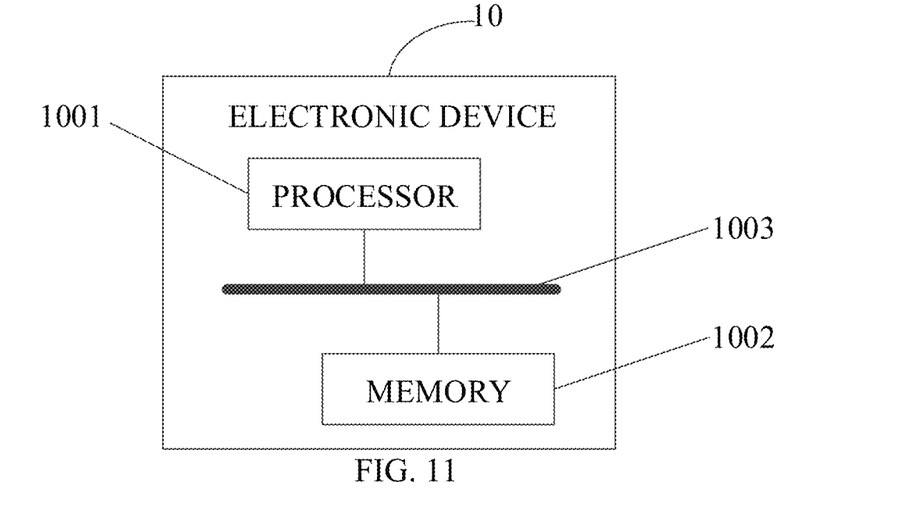
FIG. 11 is a schematic structural diagram of an electronic device provided in implementations of the disclosure.

Implementations of the disclosure provide an electronic device. The electronic device can be applied to the method for controlling the multi-screen device provided in implementations corresponding to FIG. 1 and FIG. 2. Referring to FIG. 11, the electronic device 10 (the electronic device 10 in FIG. 11 corresponds to the apparatus 9 for controlling the multi-screen device in FIG. 10) includes a processor 1001, a memory 1002, and a communication bus 1003.

The communication bus 1003 is configured to implement a communication connection between the processor 1001 and the memory 1002.

The processor 1001 is configured to execute programs for controlling a multi-screen device stored in the memory 1002 to implement the following.

A gesture triggering event is detected through a secondary screen of the electronic device, when the electronic device is in a target state. Respond to the gesture triggering event through a main screen of the electronic device.

In other implementations of the disclosure, the main screen is disposed on one surface of the electronic device and the secondary screen is disposed on another surface opposite to the one surface of the electronic device, the main screen is a foldable screen, and the processor 1001 is configured to execute the programs for controlling the multi-screen device stored in the memory 1002 to: detect the gesture triggering event through the secondary screen, when determining that the main screen is in a screen-on state and the secondary screen is in a screen-off state.

In other implementations of the disclosure, the processor 1001 is configured to execute the programs for controlling the multi-screen device stored in the memory 1002 to: respond to the gesture triggering event through the main screen, when the gesture triggering event satisfies a main-screen triggering condition.

In other implementations of the disclosure, the gesture triggering event satisfying the main-screen triggering condition includes: an operation gesture on the secondary screen satisfying a gesture triggering condition and an operation trajectory on the secondary screen satisfying a trajectory triggering condition.

In other implementations of the disclosure, the gesture triggering event satisfying the main-screen triggering condition further includes: the operation gesture satisfying a condition of a gesture in a target direction and the operation trajectory satisfying a condition of a trajectory formed along the target direction.

In other implementations of the disclosure, the processor 1001 is configured to execute the programs for controlling the multi-screen device stored in the memory 1002 to: start a split screen mode through the main screen, and display at least one display interface after split-screen on the main screen, when the operation gesture satisfies a condition of a gesture in a first direction and the operation trajectory satisfies a condition of a trajectory formed along the first direction.

In other implementations of the disclosure, the processor 1001 is configured to execute the programs for controlling the multi-screen device stored in the memory 1002 to: start the split screen mode through the main screen, and scale down a current display interface towards the first direction on the main screen and display the scaled-down current display interface, when the first direction is on the surface where the secondary screen is disposed and is from a region without the secondary screen to a region with the secondary screen.

In other implementations of the disclosure, the processor 1001 is configured to execute the programs for controlling the multi-screen device stored in the memory 1002 to: start a first application through the main screen, and display an application interface of the first application on the main screen, when the operation gesture is in a second direction and the operation trajectory satisfies a condition of a trajectory formed along the second direction.

In other implementations of the disclosure, the processor 1001 is configured to execute the programs for controlling the multi-screen device stored in the memory 1002 to: determine that at least one switchable information exists in current information output from the main screen, switch to information to-be-switched in the at least one switchable information through the main screen, and output the information to-be-switched.

In other implementations of the disclosure, the processor 1001 is configured to execute the programs for controlling the multi-screen device stored in the memory 1002 to: select the information to-be-switched corresponding to the operation trajectory from an information sequence of the at least one switchable information, when the operation gesture is changed from a third direction to a fourth direction and the operation trajectory satisfies a condition of a trajectory formed from the third direction to the fourth direction.

In other implementations of the disclosure, the processor 1001 is configured to execute the programs for controlling the multi-screen device stored in the memory 1002 to: determine the number of trajectories of at least two ordered operation trajectories; and select the information to-be-switched corresponding to the at least two ordered operation trajectories from the information sequence based on the number of trajectories, where a difference between a ranking of the current information in the information sequence and a ranking of the information to-be-switched in the information sequence is equal to the number of trajectories.

As an example, the processor 1001 may be an integrated circuit chip, having signal processing capabilities, such as a general purpose processor, a digital signal processor (DSP), or other programmable logic devices, discrete gate or transistor logic devices, discrete hardware components, etc., where the general purpose processor may be a microprocessor or any conventional processor, etc.

It should be noted that the implementation process of the steps executed by the processor in the implementation can refer to the implementation process of the method for controlling the multi-screen device provided in implementations corresponding to FIG. 1 and FIG. 2, which will not be described herein.

Implementations of the disclosure provide a storage medium. The storage medium stores one or more programs executable by one or more processors to implement the method for controlling the multi-screen device provided in implementations corresponding to FIG. 1 and FIG. 2, which is not repeated herein.

The computer storage medium/memory may be a read only memory (ROM), a programmable read-only memory (PROM), an erasable programmable read-only memory (EPROM), an electrically erasable programmable read-only memory (EEPROM), a magnetic random access memory (FRAM), a flash memory, a magnetic surface memory, an optical disk, or a compact disc read-only memory (CD-ROM). It may also be a variety of terminals including one or any combination of the above memories, such as mobile phones, computers, tablet devices, personal digital assistants, etc.

It is to be understood that, "one implementation" or "an implementation" or "implementation of the disclosure" or "above implementation", or "some implementations", or "some implementations manners" throughout the specification means that a particular feature, structure, or characteristic associated with the implementation is included in at least one implementation of this application. Thus, "in one implementation" or "in an implementation" or "implementation of the disclosure" or "above implementation", or "some implementations", or "some implementations manners" appearing in various places throughout the specification does not necessarily refer to the same implementation. Furthermore, the particular features, structures, or characteristics may be combined in any suitable manner in one or more implementations. It should be understood that, in various implementations of this application, the magnitude of the sequence numbers of the above processes does not mean the order of execution. The order of execution of each process should be determined by its function and internal logic, and should not constitute any limitation to the implementation process of the implementations of this application. The serial numbers of the foregoing implementations of this application are only for description, and do not represent the superiority of the implementations of this application.

The serial numbers of the foregoing implementations of this application are only for description, and do not represent the superiority of the implementations of this application.

It will be appreciated that the apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise. Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

The functional units in various implementations of the disclosure may be integrated into one processing unit, or each unit may be physically present, or two or more units may be integrated into one unit. The above-mentioned integrated unit can be implemented in the form of hardware or a software functional unit.

The methods disclosed in the several method implementations of this application can be combined without conflict to obtain new method implementations.

The features disclosed in the several product implementations of this application can be combined without conflict to obtain new product implementations.

The features disclosed in the several method implementations or device implementations of this application can be combined without conflict to obtain new method implementations or device implementations.

It should be noted that those of ordinary skill in the art may understand that all or part of the operations in the methods described in the foregoing implementations may be implemented by a program instructing hardware. The program may be stored in a computer readable storage medium. When executed, the steps of the above method implementations can be performed. The storage medium includes various media capable of storing program codes, such as a removable storage device, a ROM, a magnetic disk, or an optical disk.

Alternatively, the integrated unit of the disclosure may be stored in a computer readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the methods in various implementations of the disclosure. The storage media includes various media capable of storing program codes, such as a removable storage device, a ROM, a magnetic disk, or an optical disk.

It is worth noting that the drawings in the implementations of the disclosure are only for illustrating the schematic positions of the various devices in the terminal device and do not represent the actual positions in the terminal device. The actual positions of the various devices or regions may be changed or deviated according to actual conditions (e.g., the structure of the terminal device), and the proportions of different parts of the terminal device in the drawings do not represent the actual proportions.

The above are some implementations of this application, but the protection scope of this application is not limited thereto. Any changes or substitutions that can be easily conceived by those skilled in the art within the technical scope disclosed by this application should be covered by the protection scope of this application. Therefore, the protection scope of this application should be subject to the protection scope of the claims.

INDUSTRIAL APPLICABILITY

The method for controlling the multi-screen device, the electronic device, and the storage medium are provided in the disclosure. The method is applied to the electronic device with the foldable screen and includes the following. The gesture triggering event is detected through the secondary screen of the electronic device, when the electronic device is in the target state and respond to the gesture triggering event through the main screen of the electronic device. That is, in the disclosure, the detection and determination is handed over to the secondary screen of the electronic device, and the electronic device executes the operation of responding to the gesture triggering event. As such, the event executed through the main screen of the electronic device can be reduced, the response speed of the main screen of the electronic device can be improved, and the interactive mode of the electronic device with the foldable screen can be improved, improving the use experience of the user.

What is claimed is:

1. A method for controlling a multi-screen device, performed by an electronic device with a foldable screen and comprising:
   detecting a gesture triggering event through a secondary screen of the electronic device, when the electronic device is in a target state; and
   responding to the gesture triggering event through a main screen of the electronic device;
   wherein the main screen is disposed on one surface of the electronic device and the secondary screen is disposed on another surface opposite to the one surface of the electronic device, the main screen is the foldable screen, and detecting the gesture triggering event through the secondary screen of the electronic device comprises:
      detecting the gesture triggering event through the secondary screen, when determining that the main screen is in a screen-on state and the secondary screen is in a screen-off state.

2. The method of claim 1, wherein responding to the gesture triggering event through the main screen of the electronic device comprises:
   responding to the gesture triggering event through the main screen, when the gesture triggering event satisfies a main-screen triggering condition.

3. The method of claim 2, wherein the gesture triggering event satisfying the main-screen triggering condition comprises: an operation gesture on the secondary screen satisfying a gesture triggering condition and an operation trajectory on the secondary screen satisfying a trajectory triggering condition.

4. The method of claim 3, wherein the gesture triggering event satisfying the main-screen triggering condition further comprises: the operation gesture satisfying a condition of a gesture in a target direction and the operation trajectory satisfying a condition of a trajectory formed along the target direction.

5. The method of claim 4, wherein responding to the gesture triggering event through the main screen, when the gesture triggering event satisfies the main-screen triggering condition comprises:
   starting a split screen mode through the main screen, and displaying at least one display interface after split-screen on the main screen, when the operation gesture satisfies a condition of a gesture in a first direction and the operation trajectory satisfies a condition of a trajectory formed along the first direction.

6. The method of claim 5, wherein starting the split screen mode through the main screen, and displaying the at least one display interface after split-screen on the main screen comprises:
   starting the split screen mode through the main screen, and scaling down a current display interface towards the first direction on the main screen and displaying the scaled-down current display interface, when the first direction is on the surface where the secondary screen is disposed and is from a region without the secondary screen to a region with the secondary screen.

7. The method of claim 4, wherein responding to the gesture triggering event through the main screen, when the gesture triggering event satisfies the main-screen triggering condition comprises:
   starting a first application through the main screen, and displaying an application interface of the first application on the main screen, when the operation gesture is in a second direction and the operation trajectory satisfies a condition of a trajectory formed along the second direction.

8. The method of claim 1, wherein responding to the gesture triggering event through the main screen comprises:
   determining that at least one switchable information exists in current information output from the main screen, switching to information to-be-switched in the at least one switchable information through the main screen, and outputting the information to-be-switched.

9. The method of claim 8, wherein before switching to the information to-be-switched in the at least one switchable information through the main screen, the method further comprises:
   selecting the information to-be-switched corresponding to the operation trajectory from an information sequence of the at least one switchable information, when the operation gesture is changed from a third direction to a fourth direction and the operation trajectory satisfies a condition of a trajectory formed from the third direction to the fourth direction.

10. The method of claim 9, wherein selecting the information to-be-switched corresponding to the operation trajectory from the information sequence of the at least one switchable information comprises:
   determining a number of trajectories of at least two ordered operation trajectories; and
   selecting the information to-be-switched corresponding to the at least two ordered operation trajectories from the information sequence based on the number of trajectories, wherein a difference between a ranking of the current information in the information sequence and a ranking of the information to-be-switched in the information sequence is equal to the number of trajectories.

11. An electronic device, comprising:
   at least one processor; and
   a memory coupled to the at least one processor and storing at least one computer executable instruction thereon which, when executed by the at least one processor, causes the at least one processor to:
   detect a gesture triggering event through a secondary screen of the electronic device, when the electronic device is in a target state; and
   respond to the gesture triggering event through a main screen of the electronic device;
   wherein the main screen is disposed on one surface of the electronic device and the secondary screen is disposed on another surface opposite to the one surface of the electronic device, the main screen is a foldable screen, and the at least one processor configured to detect the gesture triggering event through the secondary screen of the electronic device is configured to:
      detect the gesture triggering event through the secondary screen, when determining that the main screen is in a screen-on state and the secondary screen is in a screen-off state.

12. The electronic device of claim 11, wherein the at least one processor configured to respond to the gesture triggering event through the main screen of the electronic device is configured to: respond to the gesture triggering event through the main screen, when the gesture triggering event satisfies a main-screen triggering condition.

13. The electronic device of claim 12, wherein the gesture triggering event satisfying the main-screen triggering condition comprises: an operation gesture on the secondary screen satisfying a gesture triggering condition and an operation trajectory on the secondary screen satisfying a trajectory triggering condition.

14. The electronic device of claim 13, wherein the gesture triggering event satisfying the main-screen triggering condition further comprises: the operation gesture satisfying a condition of a gesture in a target direction and the operation trajectory satisfying a condition of a trajectory formed along the target direction.

15. The electronic device of claim 14, wherein the at least one processor configured to respond to the gesture triggering event through the main screen, when the gesture triggering event satisfies the main-screen triggering condition is configured to: start a split screen mode through the main screen, and display at least one display interface after split-screen on the main screen, when the operation gesture satisfies a condition of a gesture in a first direction and the operation trajectory satisfies a condition of a trajectory formed along the first direction.

16. The electronic device of claim 15, wherein the at least one processor configured to start the split screen mode through the main screen, and display the at least one display interface after split-screen on the main screen is configured to: start the split screen mode through the main screen, and scale down a current display interface towards the first direction on the main screen and display the scaled-down current display interface, when the first direction is on the surface where the secondary screen is disposed and is from a region without the secondary screen to a region with the secondary screen.

17. The electronic device of claim 14, wherein the at least one processor configured to respond to the gesture triggering event through the main screen, when the gesture triggering event satisfies the main-screen triggering condition is configured to:
   start a first application through the main screen, and display an application interface of the first application on the main screen, when the operation gesture is in a second direction and the operation trajectory satisfies a condition of a trajectory formed along the second direction.

18. A non-transitory computer readable storage medium storing a computer program which, when executed by a processor, causes the processor to:
   detect a gesture triggering event through a secondary screen of an electronic device, when the electronic device is in a target state; and
   respond to the gesture triggering event through a main screen of the electronic device;
   wherein the main screen is disposed on one surface of the electronic device and the secondary screen is disposed on another surface opposite to the one surface of the electronic device, the main screen is a foldable screen, and the processor is caused to detect the gesture triggering event through the secondary screen of the electronic device is further caused to:
      detect the gesture triggering event through the secondary screen, when determining that the main screen is in a screen-on state and the secondary screen is in a screen-off state.

19. The electronic device of claim 11, wherein the at least one processor configured to respond to the gesture triggering event through the main screen of the electronic device is configured to:
   determine that at least one switchable information exists in current information output from the main screen, switch to information to-be-switched in the at least one switchable information through the main screen, and outputting the information to-be-switched.

20. The non-transitory computer readable storage medium of claim 18, wherein the processor is caused to detect the gesture triggering event through the secondary screen of the electronic device is further caused to:
   determine that at least one switchable information exists in current information output from the main screen, switch to information to-be-switched in the at least one switchable information through the main screen, and outputting the information to-be-switched.

* * * * *